March 5, 1957 O. B. SHERMAN 2,783,503
METHOD OF FORMING HOLLOW PLASTIC ARTICLES
Filed Sept. 21, 1953 3 Sheets-Sheet 2

INVENTOR.
ORVILLE B. SHERMAN
BY
Rule and Hoge,
ATTYS.

March 5, 1957 O. B. SHERMAN 2,783,503
METHOD OF FORMING HOLLOW PLASTIC ARTICLES
Filed Sept. 21, 1953 3 Sheets-Sheet 3

INVENTOR.
ORVILLE B. SHERMAN
BY
Rule and Hoge.
ATTYS.

United States Patent Office 2,783,503
Patented Mar. 5, 1957

2,783,503

METHOD OF FORMING HOLLOW PLASTIC ARTICLES

Orville B. Sherman, Toledo, Ohio, assignor to Owens-Illinois Glass Company, a corporation of Ohio Application September 21, 1953, Serial No. 381,220

10 Claims. (Cl. 18—55)

This invention relates to the manufacture of hollow articles, and, more particularly, hollow articles having a neck opening and made of organic plastic materials.

In the various methods of making hollow plastic articles, heretofore proposed, which utilize extruded tubing, considerable difficulty has been encountered in providing a method which will utilize the larger capacities of extrusion of the machines for supplying the tubing. In most instances, considerable waste is obtained. As a result, intermittent or discontinuous extrusion methods have been devised.

It is therefore an object of this invention to provide a method of forming hollow plastic articles wherein the tubing is supplied continuously with a minimum of waste.

Other objects of the invention will appear hereinafter.

Basically, the method includes the steps of continuously supplying plastic tubing in a suitable condition of plasticity, successively severing measured lengths of tubing from said continuously supplied tubing, transferring each said severed length of tubing to one of a series of molds, and expanding each length of tubing in its respective mold by applying fluid under pressure.

Referring to the accompanying drawings:

Figs. 1 to 4 inclusive and Fig. 6 are diagrammatic elevational views of an apparatus for performing the method, showing the position of the various parts at various steps in the method;

Figure 1:
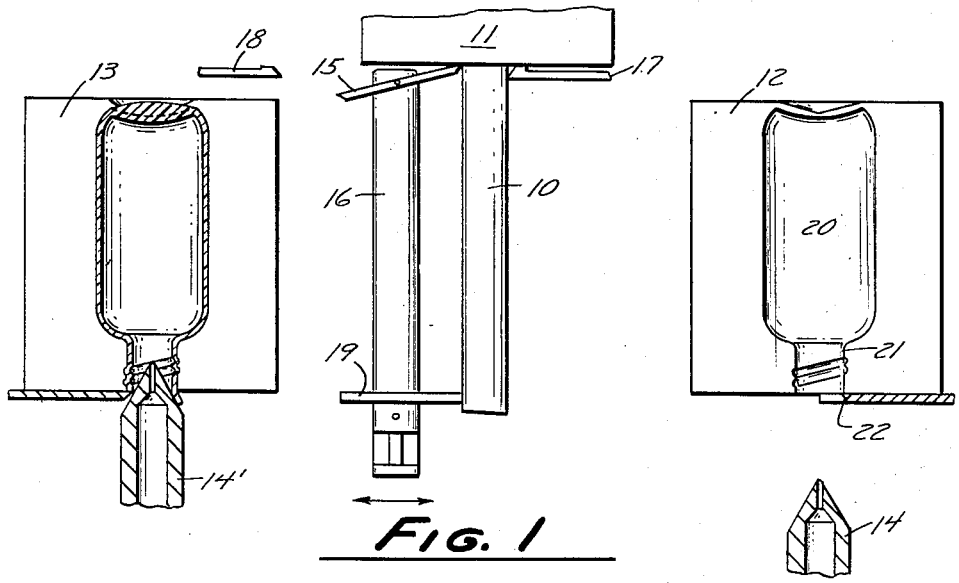
Figure 2:
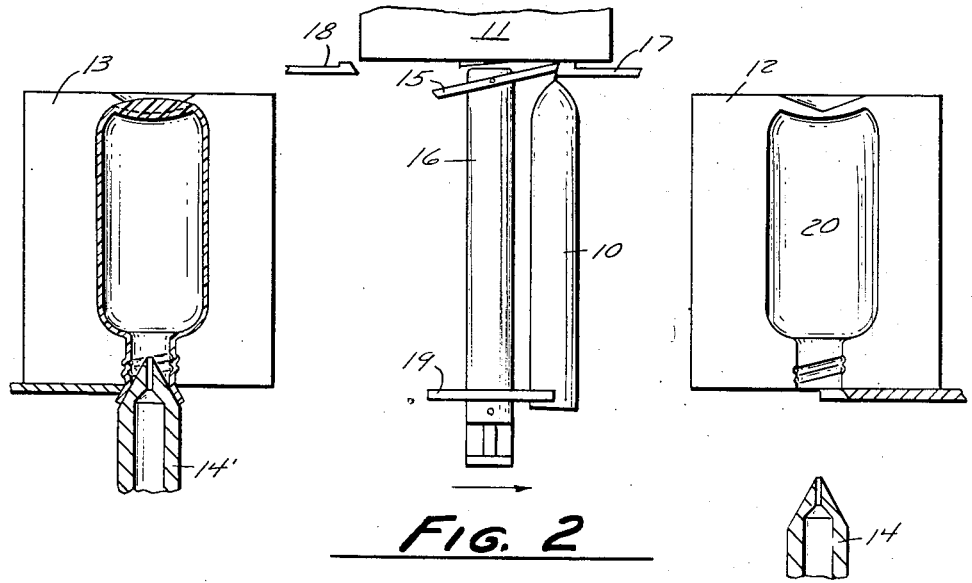
Figure 3:
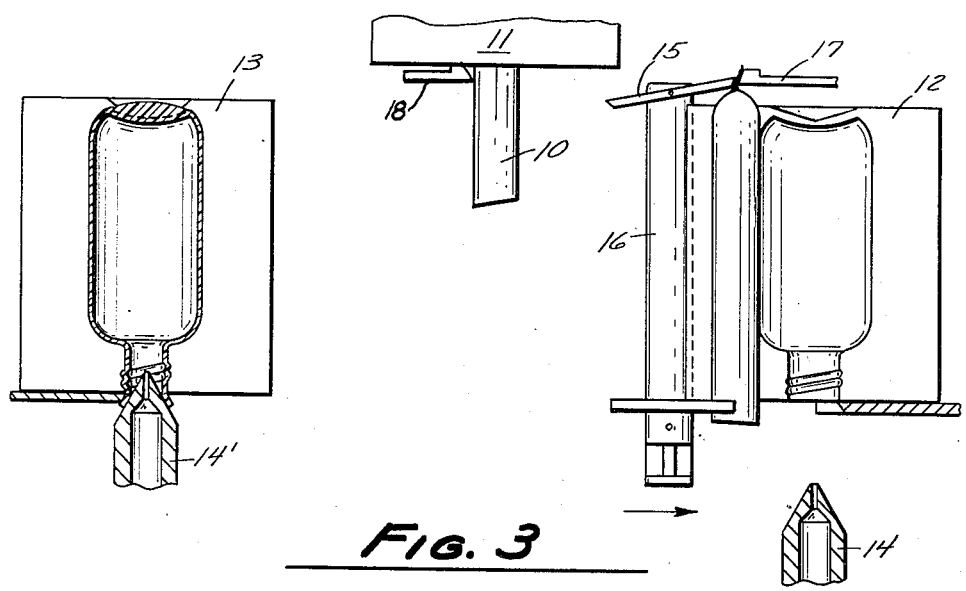
Figure 4:
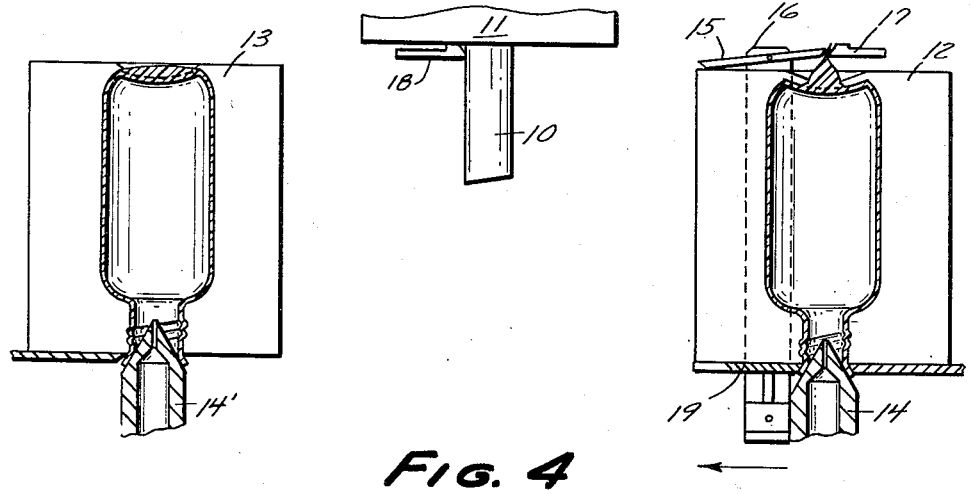

As shown in Fig. 1, plastic hollow tubing 10 is continuously supplied downwardly by extrusion through nozzle 11. A piece of tubing of the required length is severed from the tubing being supplied and transferred by apparatus, presently described, to a position between the sections of one of a series of partible molds 12, 13. The mold sections are closed and the length of tubing is expanded by application of fluid under pressure through blowhead 14 or 14′.

The means for severing the tubing comprises a shear blade 15 pivotally mounted on carrier 16. The shear blade 15 operates by direct contact with the orifice of the nozzle 11 to sever the piece of tubing. The blade 15 is passed across the orifice at an angle in order to prevent any interference with the continuous extrusion of the tubing. The blade is pivotally mounted on the carrier 16 so that successive reciprocations of the carrier past the nozzle orifice causes a length of tubing to be severed each time the blade passes across the nozzle orifice.

Guiding arms 17, 18 are positioned on either side of the shear blade and are suitably mounted for reciprocating movement. When the tubing is sheared by the blade it is pinched between the blade and one of the guiding arms 17, 18, depending upon which direction the blade is moving.

Continued movement of the blade and guide arm transfers the severed length of tubing to a position between the sections of the mold. Lower guide devices 19, mounted on carrier 16, may be used to contact and guide the lower end of the piece of tubing.

Figure 5:
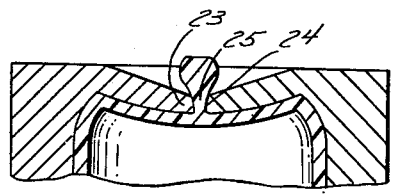
Fig 5 is a fragmentary sectional view of one end of a mold.
Figure 6:
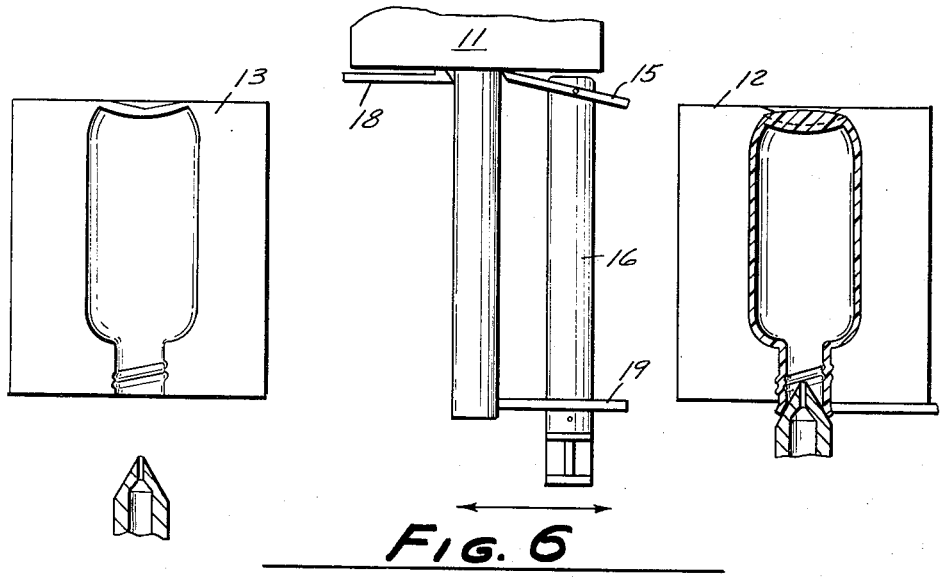

When closed, the sections of the mold form a cavity 20 and a neck opening 21. As shown in Fig. 5, the tops of the mold sections are bevelled at 23, 24 and slightly spaced apart at 25 when the mold is closed in order to seal the tubing. The bottoms of the mold sections are bevelled at 22 to receive the blowhead 14.

According to the method, the tubing 10 is in a condition of plasticity to permit expansion and setting in predetermined form.

As shown in Fig. 1, after a length of tubing is extruded downwardly, it is severed from the remainder of the tubing being extruded by movement of the shear blade 15 across the orifice of the nozzle 11. The upper end of the severed length of tubing is pinched between the shear blade and guide arm 17 and the tubing is carried thereby to a position between the sections of the mold 12. The sections are then closed pinching the upper end of the tubing at 25. The lower end of the tubing is guided by guide device 19. After the mold sections have closed blowhead 14 is brought into engagement with the lower open end of the tubing and the tubing is expanded to the walls of the mold by the application of fluid under pressure.

The severing operation is preferably performed in such a manner that the end of the tubing being extruded is left open. This insures that the lower end of each severed length of tubing is open to permit expansion by applying fluid under pressure through the open end.

In the meantime, plastic tubing is being continuously extruded from the nozzle and upon return movement of the carrier 16, a second length of tubing is severed and pinched between the shear blade 15 and the second guiding arm 18 and transferred thereby to a position between the sections of the second mold 13. This second section of tubing is expanded by application of fluid through blowhead 14′. The finished article is obtained by trimming the nubbin of plastic which was pinched by the mold, and trimming the excess plastic, if any, on the neck.

It may thus be seen that, according to my method, the tubing may be extruded continuously without interruption since each length of tubing is severed from the mass being extruded and transferred to a mold without interruption of the extrusion.

Figure 7:
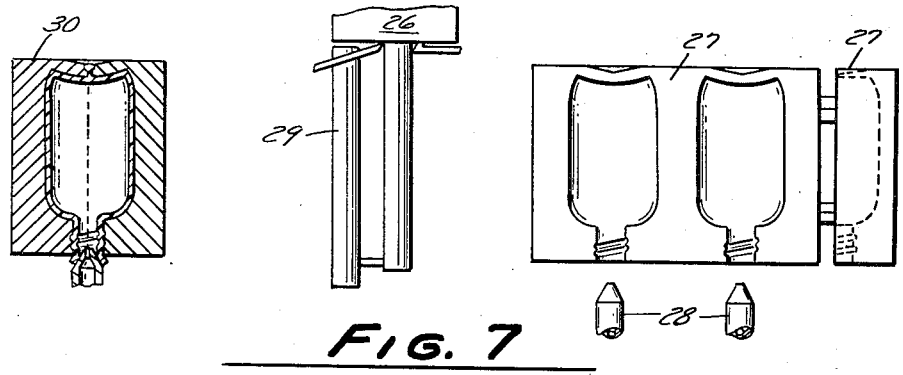
Fig. 7 is a diagrammatic elevational view of an apparatus for performing a modification of the method.
Figure 8:
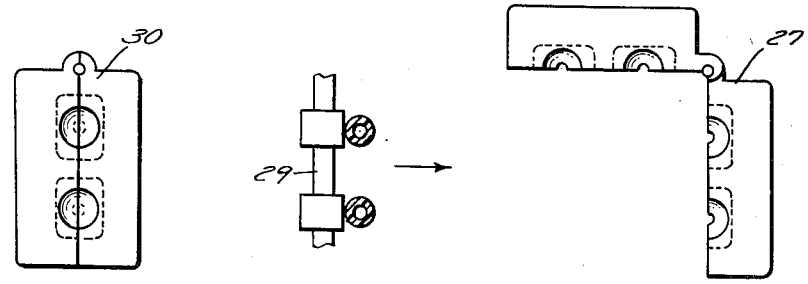
Fig. 8 is a plan view of the same, looking upwardly.

A modification of the method is shown in Figs. 7 and 8, wherein a multiplicity of orifices 26 are provided and a multiplicity of tubes are downwardly extruded simultaneously. According to the method, a series of lengths of tubing are simultaneously severed and transferred, by pinching or gripping the ends thereof, to a multiple cavity mold 27. The mold sections are closed and the lengths of tubing are expanded by applying fluid through blowheads 28. The severing and transfer may be accomplished by carrier 29, supporting a multiplicity of shear blades, pivotally mounted, and guiding devices, co-operating with a multiplicity of guiding arms. A second mold 30 may be provided, as in the previous form of invention, in order that on subsequent movement of the carrier, a second series of lengths of tubing will be severed and transferred to said second mold for expansion.

The invention has been described as used with tubing that is being extruded, but it should be apparent that it is equally applicable with use on tubing which is being provided in the required condition of plasticity, for example, tubing that is preformed and subsequently reheated to the required condition of plasticity and continuously fed downwardly in a manner similar to the downward extrusion.

The invention has been described as applicable to thermoplastic materials. The term "thermoplastic" as used herein defines any organic material which has the required condition of plasticity to permit expansion and setting in predetermined form.

The terms tubular or tubing as used herein are used to define any hollow shapes of plastic material which may be extruded and include non-circular or irregular shapes.

Modifications may be resorted to within the spirit and scope of the appended claims.

I claim:

1. The method of forming hollow plastic articles which comprises supplying a substantially continuous tubing of plastic material, said tubing being in a condition of plasticity to permit expansion and setting in predetermined form, simultaneously severing and gripping a length of tubing from the tubing being supplied, said severing being accomplished in such a manner that the end of the tubing being supplied remains open, transferring said severed length of tubing to a mold and expanding said length of tubing to the walls of said mold by applying fluid under pressure through the open end of the length of tubing.

2. The method of forming hollow plastic articles which comprises substantially continuously providing tubing of plastic material in a downward direction, said tubing being in a condition of plasticity to permit expansion and setting in predetermined form, severing a length of said tubing from the remainder of the tubing being supplied in such a manner that the end of the tubing being supplied remains open, gripping the upper end of said length of tubing and transferring said tubing thereby to a mold, expanding said length of tubing to the walls of said mold by applying fluid under pressure through the open end of the length of tubing.

3. The method of forming hollow plastic articles which comprises continuously and downwardly extruding tubing of plastic material, said tubing being in a condition of plasticity to permit expansion and setting in predetermined form, severing a length of said tubing from the remainder of the tubing being extruded in such a manner that the end of the tubing being extruded remains open, concurrently closing one end thereof and transferring said severed length of tubing laterally to a mold, and expanding said severed length of tubing to the walls of the mold by applying fluid under pressure.

4. The method of forming hollow plastic articles which comprises continuously downwardly extruding tubing of plastic material, said material being in a condition of plasticity to permit expansion and setting in predetermined form, severing a length of tubing from the remainder of tubing being extruded in such a manner that the end of the tubing being extruded remains open, gripping the upper end of said severed length of tubing and transferring said tubing thereby in a lateral direction to a mold, and expanding said length of tubing to the walls of the mold by applying fluid under pressure through the open end of the length of the tubing.

5. The method of forming hollow plastic articles which comprises continuously downwardly extruding tubing of plastic material, said tubing being in a condition of plasticity to permit expansion and setting in predetermined form, severing a length of tubing from the remainder of the tubing being extruded in such a manner that the end of the tubing being extruded remains open, gripping the upper end of said severed length of tubing and transferring said tubing thereby to the open sections of a partible mold, sealing the upper end of said tubing by closing the sections of the mold, the resultant length of tubing in the mold thereby having the upper end closed and the lower end open, and expanding the tubing in the mold to the walls of the mold by applying fluid under pressure through the open end of the length of tubing in the mold.

6. The method of forming hollow articles of plastic material which comprises continuously downwardly extruding an unconfined tubing of plastic material, said tubing being in a condition of plasticity to permit expansion and setting in predetermined form, severing a length of said tubing from the remainder of the tubing being extruded in such a manner that the end of the tubing being extruded remains open, simultaneously closing one end thereof and transferring said severed length of tubing to a mold, expanding said tubing to the walls of the mold by applying fluid under pressure through the open end of the tubing, severing a second length of tubing from the tubing being extruded in such a manner that the end of the tubing being extruded remains open, said second length of tubing having been extruded during the interval when the first length of tubing is being transferred and expanded, transferring said second length of tubing to a mold, and expanding said second length of tubing to the walls of the mold by applying fluid under pressure through the open end of the tubing.

7. The method of forming hollow plastic articles which comprises continuously downwardly extruding a multiplicity of tubes of plastic material, said tubing being in a condition of plasticity to permit expansion and setting in predetermined form, simultaneously closing one end of and severing a multiplicity of lengths of tubing from said tubular extrusions, simultaneously transferring said lengths of tubing to a multiple cavity mold, maintaining said lengths in controlled relationship during said transfer, enclosing said lengths in a mold expanding each length of tubing to the walls of its respective cavity by applying fluid under pressure to each length of tubing, and continuing the extrusion and severing of successive lengths of tubing.

8. A method of forming hollow plastic articles which comprises the steps of continuously extruding unconfined tubing of plastic material, said tubing being in a condition of plasticity to permit expansion and setting in predetermined form, severing successive lengths of tubing from the extruding tubing material, alternately transferring the successive severed lengths of tubing to alternate molds spaced from the source of extrusion, enclosing said severed lengths in succession in said molds, and expanding such successive lengths to the confines of the successive molds during the extrusion of the next succeeding lengths of tubing.

9. A method of forming hollow plastic articles which comprises the steps of continuously downwardly extruding unconfined freely suspended tubing of plastic material, said tubing being in a condition of plasticity to permit expansion and setting in pre-determined form, severing successive lengths of tubing from the extruding tubing material, alternately transferring in opposite lateral directions each successive severed length of tubing to alternate molds laterally spaced from the source of extrusion, enclosing each severed length in a mold, and expanding each successive length to the confines of the mold during at least a portion of the extrusion of the next succeeding length of tubing.

10. A method of forming hollow plastic articles which comprises continuously downwardly extruding an unconfined freely suspended tubing of plastic material, said tubing being in a condition of plasticity to permit expansion and setting in pre-determined form, severing successive lengths of tubing from the extruding tubing materials in such manner that the end of the continued extrusion remains open, concurrently closing one end thereof and alternately transferring in opposite lateral directions each successive severed length of tubing to alternate molds spaced laterally from the source of extrusion enclosing each severed length in a mold, and expanding each successive length to the confines of the mold during at least a portion of the extrusion of the next succeeding length of tubing.

References Cited in the file of this patent

UNITED STATES PATENTS

| | | |
|---|---|---|
| 2,262,612 | Kopitke | Nov. 11, 1941 |
| 2,579,390 | Mills | Dec. 18, 1951 |
| 2,657,431 | Slaughter | Nov. 3, 1953 |
| 2,669,752 | Pratt | Feb. 23, 1954 |